United States Patent
Sangkeun et al.

(10) Patent No.: US 8,295,633 B2
(45) Date of Patent: Oct. 23, 2012

(54) SYSTEM AND METHOD FOR AN ADAPTIVE DE-BLOCKING FILTER AFTER DECODING OF COMPRESSED DIGITAL VIDEO

(75) Inventors: Lee Sangkeun, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1351 days.

(21) Appl. No.: 11/696,667

(22) Filed: Apr. 4, 2007

(65) Prior Publication Data

US 2008/0247664 A1    Oct. 9, 2008

(51) Int. Cl.
*G06K 9/40*    (2006.01)
(52) U.S. Cl. ............... 382/268; 382/269; 375/240.27
(58) Field of Classification Search ............... 382/268, 382/269
See application file for complete search history.

(56) References Cited

U.S. PATENT DOCUMENTS 6,236,764 B1 *    5/2001    Zhou ..................... 382/266

OTHER PUBLICATIONS

Wang et al: "No-reference perceptual quality assessment of JPEG compressed images", IEEE-ICIP, 2002.*

* cited by examiner

*Primary Examiner* — Matthew Bella
*Assistant Examiner* — Ruiping Li (57) ABSTRACT

A system and method that adjusts the strength of a de-blocking filter to remove block artifacts in compressed video is disclosed. Block artifacts are associated with the block-based image/video compression techniques. The block artifacts deteriorate the quality of compressed image and video, especially at low bit rates. A de-blocking method estimates the strength of the block artifacts at each block boundary either directly from the MPEG decoder or from a measurement process or both, and adjusts the de-blocking parameters accordingly. An additional block content analysis improves the performance of the overall de-blocking process.

11 Claims, 4 Drawing Sheets

SYSTEM AND METHOD FOR AN ADAPTIVE DE-BLOCKING FILTER AFTER DECODING OF COMPRESSED DIGITAL VIDEO

CROSS-REFERENCE TO RELATED APPLICATIONS

This application is related to U.S. patent application Ser. No. 11/448,373, filed Jun. 6, 2006, entitled "A Method and Device for Measuring MPEG Noise Strength of Compressed Digital Image."

BACKGROUND OF THE INVENTION

1. Field of the Invention

The present invention relates in general to noise reduction or removal from compressed video images, and more particularly to reduction or outright removal of block artifacts that are associated with block-based compression/coding schemes.

2. Description of the Related Technology

As demonstrated by the near-universal application of the MPEG algorithm, block transform coding based on the discrete cosine transform is a proven method for image compression. The method divides images into blocks and then treats each block independently, applying a numerical transform to the blocks, quantizing the transform coefficients and then efficiently encoding the string of coefficients. Currently, Digital TV (DTV) broadcasting in the U.S. uses the MPEG-2 international video compression standard to compress digital video content. DVD video content may be processed using the MPEG-2, MPEG-4, or H.264 standards.

These are block based algorithms. Block based video compression introduces artifacts that deteriorate the quality of the displayed video images and scenes; the artifacts in MPEG-processed digital videos are often referred to as "MPEG noise", or "compression noise." Compression noise reduction is the process that detects and removes or reduces the imperfections introduced by MPEG from the digital video images before displaying the recovered video.

The artifacts appear as undesired spurious edges or discontinuities at block boundaries in images. They arise as stated above in images and videos that are compressed by block-based coding schemes such as JPEG, MPEG, and H.26X. In these coding techniques, a picture is divided into an array of N-by-N rectangular blocks of pixels (the number of pixels N is usually 16) that are called macroblocks. Then, each macroblock is again sub-divided into M-by-M pixels (M is usually 8) sub-blocks. Each sub-block is typically processed by an 8-by-8 discrete cosine transform (DCT) into an array of 8×8 coefficients; these are quantized with a block size that may vary from block to block. That is the coefficients may be binned into a smaller set of values thus reducing the number of required bits for each coefficient. The quantized coefficients are scanned in a zig-zag pattern to reduce them to a one-dimensional string and the string of coefficients is then entropy encoded. Each sub-block is processed independently of other sub-blocks.

Because each sub-block is processed independently of all others, a critical portion of the video image data that connects neighboring blocks may be lost, leading to superfluous edges and artificial discontinuities appearing at the block boundaries. Block artifacts become more noticeable as the image/video is compressed more, i.e., at higher compression ratios that require increasing the quantization block size to reduce the data rate at the compression unit's output.

Approaches for reducing compression noise involve estimating the artifact strength and reducing the artifacts according to the measured results. Block artifacts appear with varying strengths at the boundaries of sub-blocks within a coded image. If a fixed non-adaptive de-blocking filter were uniformly applied to all block boundaries, either the strong block artifacts would not be adequately reduced or fine image features would be blurred due to over smoothing. Therefore a technique for correcting the artifact is needed which adapts to the strength of the artifacts to be corrected and the activity in the video data that surrounds it.

SUMMARY OF CERTAIN INVENTIVE ASPECTS

One aspect of the invention provides a method of reducing video artifacts due to compression noise. The method comprises: decoding data representing a compressed image of the video; locating block boundaries in the decoded image; estimating the strength of the artifacts on the block boundaries; smoothing at least one section of the block boundaries having artifacts, wherein the amount of smoothing is based on the strength of the artifacts detected in the section; and replacing at least one section of the block boundaries having artifacts with the smoothed version of the section.

The strength of the artifact may be determined from data that represents the decoded image. A quantization level may form at least one parameter of the smoothing used to conceal the artifact. The quantization level may be formed by combining two values of the quantization level, wherein the first value is taken from the data representing an encoded sub-block and wherein the second value is taken from the data representing the decoded sub-block. The second value may be estimated based on a plurality of block edge statistics derived from the sub-block. The estimation may comprise calculating a plurality of block edge statistics which comprise a block edge metric, a block ratio metric, a block count metric and a block activity metric, wherein each metric is determined by the video intensities of the pixels of sub-block. The values of the block edge statistics may be each formed into a weight factor by mapping to an interval extending from zero to one using a weighting function specific to that metric. The weight factors may be multiplied together to form a composite weight factor indicative of the strength of the compression noise in the sub-block. The method may additionally comprise individually averaging a sub-block weight factor over the image to form a global weight factor. The composite weight factor and the global weight factor are multiplied together so as to form a global compression strength. The sub-block may be smoothed subsequent to the determination that the global compression strength is less than a variable found by mapping the quantization level to the interval [0,1] by use of a weighting function. A plurality of smoothing parameters may be based on the magnitude of the discontinuity at the sub-block's boundary. The magnitude of the discontinuity may be modified by one of the parameters that is indicative of the quantization level and one of the parameters that is associated with sign changes detected along a path of pixels that leads to the discontinuity, wherein the path is perpendicular to the boundary on which the artifact lies, and wherein the local mean has been subtracted from the intensity of each pixel in the path. One of the parameters that is indicative of the activity in the values of the intensity of the video in the path of pixels may modify the magnitude of the discontinuity. The compression noise may be caused by using a block based compression algorithm.

Another aspect of the invention provides a system for reducing video artifacts due to compression noise. The system comprises: means for decoding data representing an encoded image of the video; means for locating block boundaries in a decoded image; means for estimating strength of artifacts on the block boundaries; and means for smoothing at least one section of the block boundaries having artifacts. The amount of smoothing is based on the strength of the artifacts detected in the section; and means for replacing at least one section of the block boundaries having artifacts with the smoothed version of the section. The means for estimation determines the strength of the artifacts from the data that represents the decoded image. The means for replacing sections of block boundaries uses a smoothing filter to determine values of replacements for the video, at least one parameter of the filter being determined by a quantization level. The means for replacing sections of block boundary forms the quantization level by combining two values of the quantization level, wherein a first value is taken from the data representing an encoded sub-block, and wherein a second value is taken from the data representing the decoded sub-block. The means for replacing sections of block boundaries bases the second value of the quantization level on a plurality of block edge statistics derived from the sub-block. The means for replacing sections of block boundaries evaluates the following block edge statistics: a block difference, a block ratio, a block count and a block activity, each evaluation based on the video intensities of the pixels of the sub-block. The compression noise is caused by using a block based compression algorithm.

Still another aspect of the invention provides a system for reducing video artifacts due to compression noise. The system comprises: a decoder inputting compressed video indicative of a plurality of encoded images; an estimator that determines block boundaries in each decoded image and estimates the strength of artifacts in the block boundaries; and an image artifact filter that smoothes at least one section of the block boundaries having artifacts, wherein the amount of smoothing is based on the strength of the artifacts detected in the section, and replaces at least one section of the block boundaries having artifacts with the smoothed version of the section.

DETAILED DESCRIPTION OF CERTAIN INVENTIVE EMBODIMENTS

The following detailed description is directed to certain specific aspects of the three-dimensional noise reduction filter. However, the system can be embodied in a multitude of different ways as defined and covered by the claims. In this description, reference is made to the drawings wherein like parts are designated with like numerals throughout.

Because MPEG and its variants are block-based, lossy video compression algorithms, noise caused by the coarse quantization of transform coefficients is noticeable as visible discontinuities at block boundaries. Motion compensated prediction may also cause discontinuities at the edges of the copied block. Often the decoder is physically separate from the viewer's location. The compressed version of the image is therefore not available for use in reducing the visibility of the artifacts due to compression. This circumstance is found in cable systems in which some video signals are transmitted in the digital compressed format somewhere along their transport to the home, e.g. as a digital network feed, but are converted to the analog format because their channels are part of the cable provider's basic viewing package.

Figure 1:
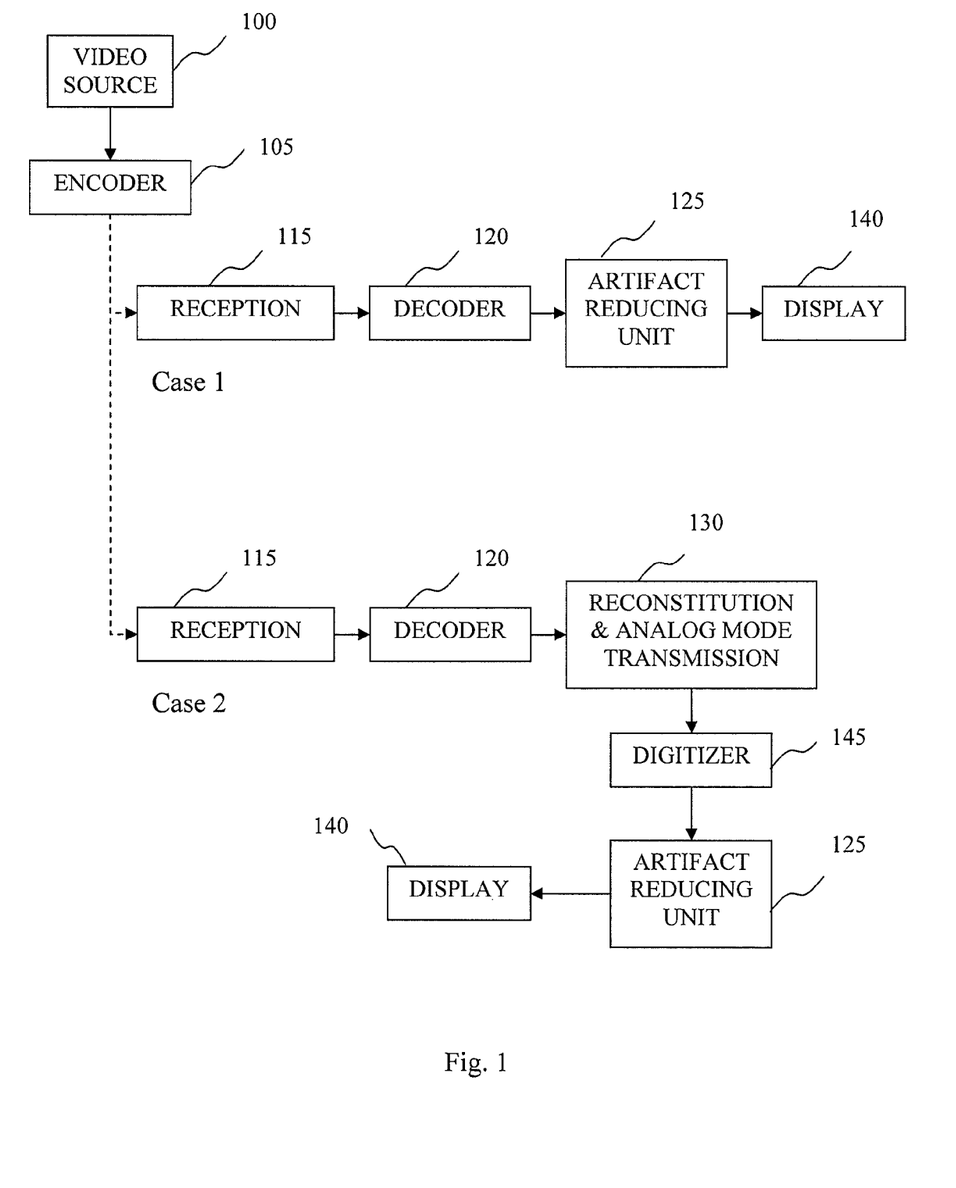
FIG. 1 is a system level block diagram that illustrates the processing for two possible circumstances for estimating the quantization level: (1) the encoded video is available to aid in removing an artifact in the decoded video; (2) only the decoded video is available.

A typical application for an artifact reducing filter is shown in FIG. 1. Two possible situations are shown. In both cases, a video source 100 is digitized and compressed in a block based algorithm such as MPEG2 in block 105 and transmitted, typically by satellite, to two different reception sites. In case 1, the digital signal is received and the data is recovered in block 115. Data representing images generated in the video source 100 and encoded in block 105 is fed to a decoder unit 120, whose output, consisting of frames and artifacts is fed to the artifact reducing filter 125. The filter processes and outputs numerical values. With the artifacts masked by the filter, the filter produces images that are converted into signals suitable for viewing on a display 140. Having the decompression unit in close proximity to artifact reducing filter gives the filter access to the ancillary data, such as the quantization parameters, i.e., the block size used to quantize the coefficients found by the discrete cosine transform that is part of the compression algorithm.

In an alternate configuration, shown as case 2, the reception block 115 and decompression unit 120 operate as described in case 1. The reception block 115 may be, for example, realized as a satellite receiver and associated processing equipment such as error control circuitry and a demultiplexor. The next block is to reconstitute the video and transmit it in an analog mode of transmission in block 130. If blocks 115, 120 and 130 take place within a cable head end, the video would be sent as a signal in the standard NTSC broadcast format. After being received by a subscriber and demodulated, the video signal is digitized in block 145 so that it may be processed in the artifact reducing filter. The result, being digital, must be converted to an electrical waveform for display. As in case 1, the artifact reducing filter 125 feeds the display 140. In case 2 the artifact reducing filter does not have access to compressed video data from which to read the value of the quantization level. Therefore to be universally applicable, the filter must be able to operate with or without access to data that represents compressed video.

Since the coarseness of the block size directly affects the incidence and magnitude of artifacts in the video processed by block based compression algorithms, its value is necessary for evaluating and correcting the artifact problem. If the compressed data is available, the value for the quantization level of the sub-block is included in the transmitted data. It may be utilized to estimate the level of the compression noise, if the value is accepted as being reliable. The quantization level taken from the compressed video stream may not be reliable if the video is coded twice, with an intervening decoding block, and the second coding using a smaller block size than the first. In that instance the artifacts would be largely due to the first coding and would be reproduced by the second. Checking the reliability of the value of the quantization level and finding an alternate value for the quantization if one is required are blocks necessary to make this artifact reducing filter universally applicable. The solution is to derive a value of the quantization level, Q, or a variable that is closely related to Q from the video image itself that would be utilized as a surrogate for Q when needed. Note that in MPEG the quantization level may change from sub-block to sub-block so that estimation of Q can be based only on the 8×8 pixel intensities in a sub block.

Figure 2:
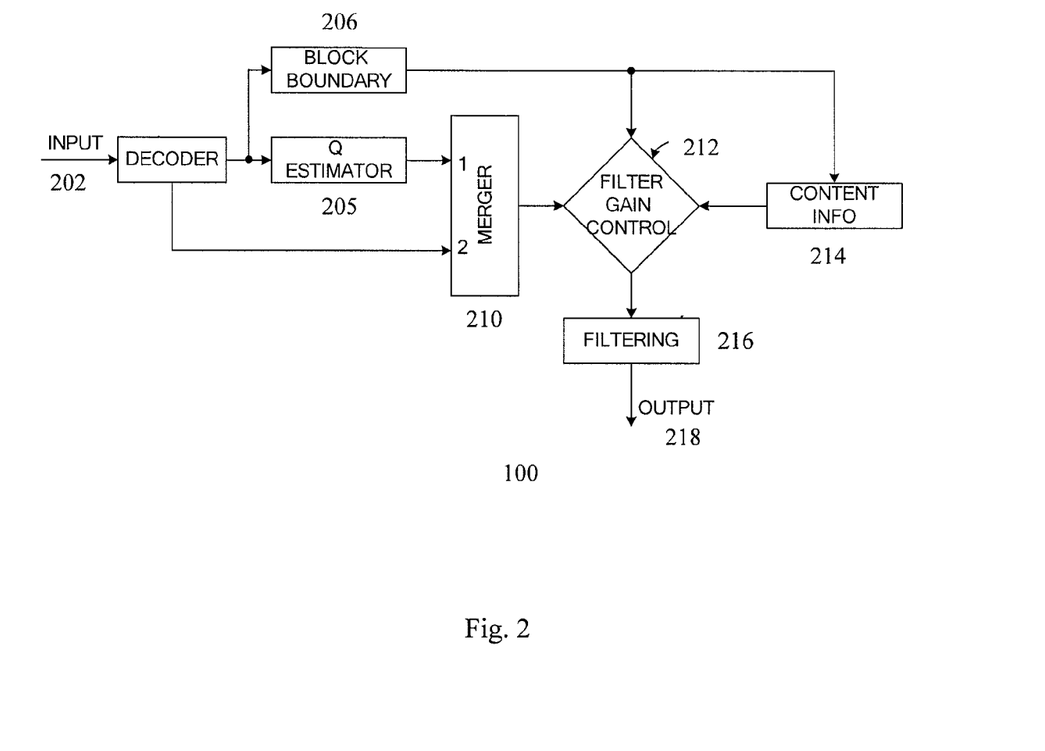
FIG. 2 is a block diagram illustrating the signal flow needed to smooth artifacts due to compression.

The sub-block is found in block 206 of FIG. 2. The first block in 205 is to establish the sub-block boundaries. This is a simple task if the compressed video is available, since it can be derived from the format in which the compressed data is presented, but requires re-sampling the uncompressed video if only that data is present. Once the sub-blocks are defined, the block boundaries are established and their locations are passed to block 212.

The compression noise strength is defined as the average peak to peak value of the compression noise artifacts. Since the compression noise strength is closely related to the quantization level, the compression noise strength is estimated from the video data. This observation variable is developed from four metrics that are based on block edge data. The block edge data is found by applying the Sobel or another edge detection operator to the individual sub-block. This takes place in block 200 of FIG. 3 and in block 205 of FIG. 2.

After metrics have been found by processing each individual sub-block, the individual results are aggregated into global quantities valid for the entire image. The first metric, the block edge value, is found in block 302 of FIG. 3 and is defined to be the average magnitude of edge pixels located at block boundaries. It is computed by averaging the output values of Sobel edge operator that are within the range (a, b). The values of a and b are determined by simulation. The block edge value is computed locally for each sub-image: one edge value is computed for the horizontal boundary and another edge value is computed for the vertical boundary in each sub-image.

Figure 3:
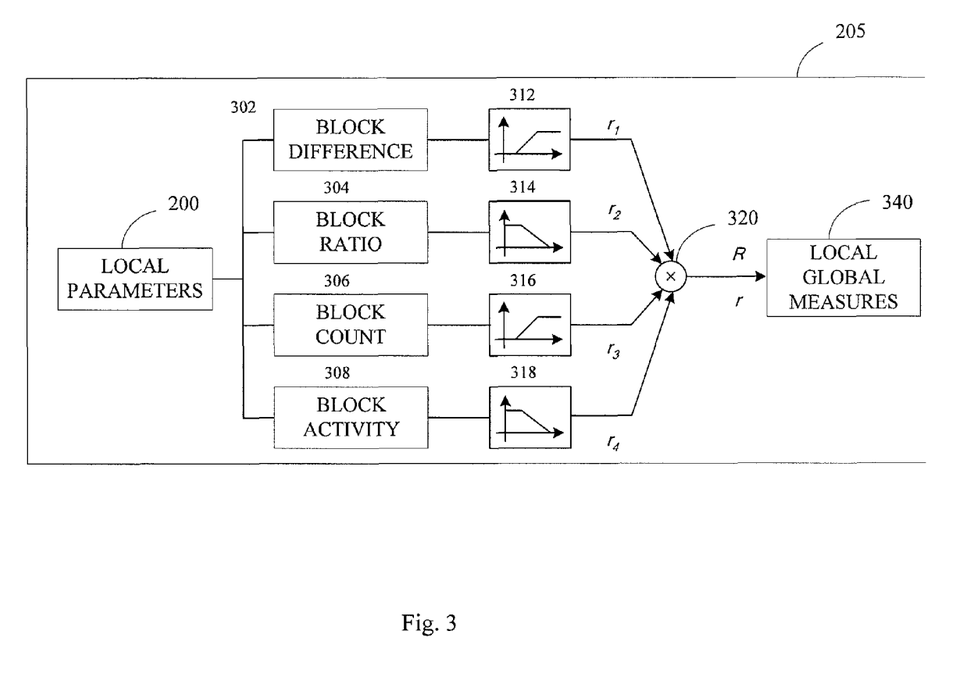
FIG. 3 is a block diagram of the process whereby the compression noise strength is estimated from the decoded video itself.

The second matric, the block ratio, found in 304, is computed as follows: A pixel is counted as an edge pixel if the result of the edge operator falls within a given range, for example, greater than a but less than b. The processing proceeds in one direction, say horizontally first, and then vertically. The columns having edge pixels are separated into 8 groups according to an index i=x mod 8=0 . . . 7 where x is the column number. (The mod denotes the modulo operation.) The edge pixels in each group (i=0, . . . 7) are counted separately. Then the block count $BC_b$ for the column located at the block boundary (i=7) and another block count $BC_m$ that is the largest count value in the 8 groups excluding the one at the block boundary are read. The block ratio is the ratio between these two counts, i.e., $BC_m \div BC_b$. If $BC_b$ at the block boundary is the largest number in the 8 groups, the second largest number is assigned to $BC_m$. The block ratio is smaller than unity in this case. Otherwise, the edge ratio is greater than a unity. A second block ratio is found separately in the vertical direction and is row-based. The third metric, the block count, illustrated in block 306, is the total number of edge pixels fallen in the range (a, b) and located at block boundaries. The block count is computed locally for each sub-image. Separate block edge counts are computed for the horizontal boundaries and vertical boundaries in each sub-image.

The fourth metric, block activity, seen as block 308, in FIG. 3 is computed locally also. The block activity metric is formed by counting the number of sign changes within the sub-blocks separately in the vertical and the horizontal directions after subtracting from each pixel intensity in the row or column (whichever is applicable) the mean row or column intensity. The block activity is measured within the blocks, not at the block boundaries. If the number of sign changes is high, the content of the sub-image is probably complex and processing for removing artifacts should be weak.

The block ratio is an important metric that is negatively correlated with the visible presence and large numbers of block artifacts. If the ratio is large, i.e., greater than ¾, few block artifacts are expected to be formed. As the ratio is decreased, more block artifacts are likely to appear at all block boundaries in the sub-image.

A large block edge value means that real edge features are present at block boundaries across the sub-section. In that situation, strong filtering operation that smoothes out block boundaries should be avoided. However, if the block ratio is small, the large block count indicates that the block artifacts are numerous and that there is a large difference in pixel values across the block boundaries. A large block count could also mean that many edge features rather than artifacts are present at block boundaries. If the block ratio is large, a large edge block count confirms the possibility that the image has many edge features near block boundaries.

These four parameters describe the block edge content of the image. When combined and interpreted, the magnitude and extent of block artifacts can be estimated. Interpretation of each metric is achieved by mapping each metric into the interval [0,1] using piece-wise linear weighting functions designed for each metric of the four described. The shapes of the weighting functions insures that weighting factors close to unity would indicate a high incidence of artifacts on the sub-block boundary. Because all four metrics require separate measurements in the horizontal and vertical directions, each weighting factor will have two values, one for each direction. The pair of weighting factors are averaged together, reducing the set of weighting factors to four quantities between zero and one:

$r_1$, indicative of the block edge value;
$r_2$, indicative of the block ratio;
$r_3$, indicative of the block count; and
$r_4$, indicative of the block activity.

The local compression noise strength r is obtained by multiplying all of the weighting factors ($r_1, r_2, r_3$, and $r_4$) together in the block 320. The global compression noise strength R is computed by multiplying together the values of each strength factor averaged over the whole image to form $$R = \prod_i^4 R_i \qquad (1)$$

In Eq. 1, $R_i$ is the average value for each $i^{th}$ estimated strength factor (i=1, . . . 4) and defined by $$R_i = \frac{1}{M \cdot N} \sum_{m=1}^{M} \sum_{n=1}^{N} r_i^{mn}, \qquad (2)$$

where M and N are the vertical and horizontal numbers of sub-images, and $r_i^{mn}$ is the $i^{th}$ weighting factor located at (m, n) sub-image. The global variable R is a measure of the compression noise strength of the entire image and is closely tied to the average coarseness of the quantization level used in compressing the image. (The quantization level is used to limit the quantity of data needed to represent that block to manageable proportions.) As shown in block 220, the quantization level for each sub-block or its equivalent is compared to R; only those sub-blocks that have as much or more compression noise than average are processed for artifact smoothing.

The Q estimator (block 205 of FIG. 2) provides an additional estimate of the quantization level that is based on the actual video in the sub-block. Since r, the local compression strength, that is found in block 320 and the quantization level are both tightly tied to the compression noise strength, they are tightly tied to each other. To combine them requires that the local value of the quantization level be mapped into the interval [0,1]. This is done by means of the weighting function g(Q), equal to 1−f(Q), where f(Q) is defined by $$f(Q) = \begin{cases} 1 & Q < Th1 \\ \frac{Q - Th1}{Th2 - Th1} & Th1 < Q < Th2 \\ 0 & Th2 < Q \end{cases} \quad (3)$$

where Th1=5, and Th2=15. When g(Q) is zero, (and that value is validated by the measured value of r) no deblocking is done. Likewise when Q exceeds 15, full deblocking filtering is applied. When there is significant disagreement between g(Q) and the measured value of r, the latter is more heavily weighted, since it is derived from real data.

Having condensed the sub-block data to values of r, each a sub-block artifact indicator, and to R, the global image artifact indicator, control of the artifact removal process transitions to block 210. Block boundaries have already found in block 206. Using the location of the boundaries pairs of values of the intensities of pixels that straddle the block boundaries are recovered from memory. The difference between the intensities of the paired pixels is taken and a decision based on the values of r for two adjoining sub-blocks is made as to whether the differences, if any, are due to compression artifacts or to picture edges. If a difference is regarded as artifact, its value, denoted now as Δ, is saved. The quantity Δ is the basis for the filter gain.

Figure 4:
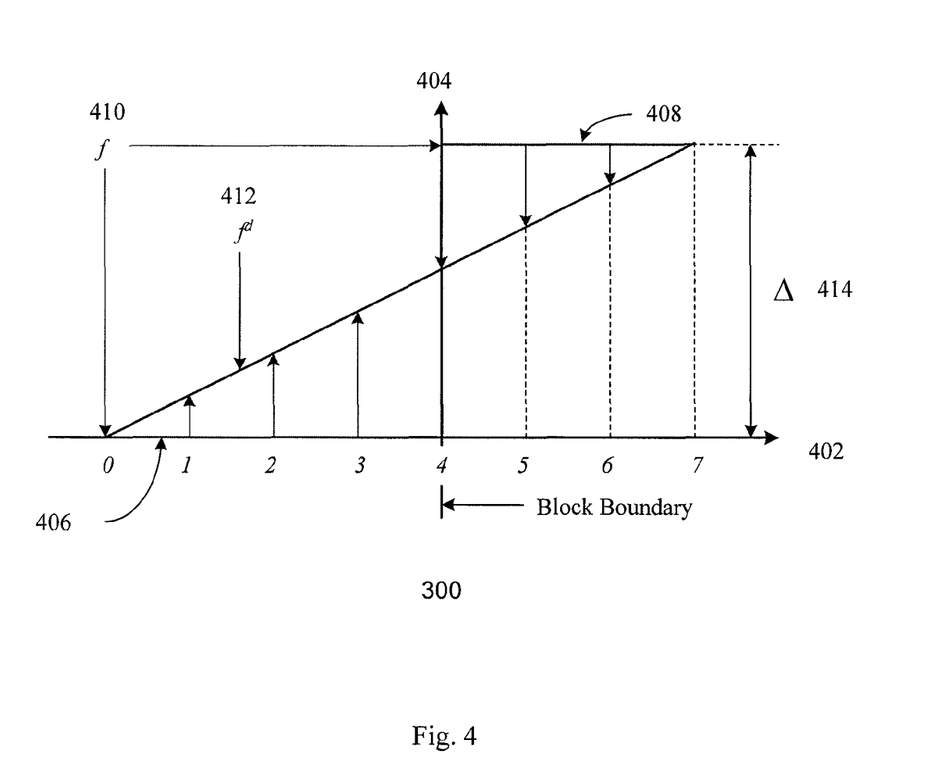
FIG. 4 is an example of the process whereby an effect of discontinuity due to compression is spread over the adjacent pixels.

An example of a filter controlled by a gain factor for reducing compression artifacts is provided in FIG. 4. The filtering operation 300 describes how the invented system works with obtained information.

In the figure, two coordinates 402 and 404 indicate pixel indices and the corresponding pixel values, respectively. A target input block 410 for filtering consists of the right half 406 of a left block and the left half 408 of a right block. The boundary is between pixels 3 and 4. The vector f=[f(0) f(1) f(2) f(3) f(4) f(5) f(6) f(7)] lists the pixel intensities in the target block before smoothing. The discontinuity indicated by 410 is Δ=f(3)−f(4). The pixel values in f are filtered using filter coefficients h=[−h(0) −h(1) −h(2) −h(3) h(4) h(5) h(6) h(7)] and result in the output pixels $f^d$=[$f^d$(0) $f^d$(1) $f^d$(2) $f^d$(3) $f^d$(4) $f^d$(5) $f^d$(6) $f^d$(7)] in 412 through the relationship $f^d$=f+Δh.

In general, the difference Δ from the block artifact is obtained from subtracting the last pixel value of right/bottom block from the first pixel value of the left/upper block as defined by Δ=f(3)−f(4).

An example of how this filter works is given below. The input pixels and filter coefficients are f=[0 0 0 0 40 40 40 40] and h=[0 −⅛ −¼ −½ ½ ¼ ⅛ 0], respectively. Therefore Δ=−40. The output is $f^d$=[0 5 10 20 20 30 40] showing that the block increase at the boundary has been distributed to the eight pixels that are divided by the boundary. This filter preserves the structure of the content, minimizing possible side effects caused by filtering. The filter is designed to compromise between treating block difference value Δ as a real edge or a blocking artifact. Adjustments are made in block 216 to the value Δ based on the compression information obtained from the MPEG decoder or its equivalent in the Q− estimator. In addition, this invention re-analyzes the contents of the target block and modifies the block difference value Δ according to the strength of block artifacts as follows.

The quantization level is determined as a combination of the values of g(Q), defined in conjunction with Eq. (3) and r derived for each sub-block. If the quantization level is less than a certain threshold $\gamma_1$, the amount of block artifacts in the picture are negligible. If the quantization level Q is between $\gamma_1$ and $\gamma_2$ ($\gamma_1 < \gamma_2$), there are a considerable number of block artifacts. If Q is larger than $\gamma_2$, the picture is severely contaminated. Therefore an adjusted block difference value with the quantization level is computed by $$\Delta_Q = \Delta \cdot (\max(a,b) - g_Q(Q)).$$

where max(a,b) picks the larger of two variables. The weighting function $g_Q(\cdot)$ is defined by $$g_Q(\chi) = \begin{cases} a, & \text{if } \chi < \tau_1 \\ \frac{b-a}{\tau_2 - \tau_1}(\chi - \tau_1) + a, & \text{if } \tau_1 \leq \chi \leq \tau_2 \\ b, & \text{otherwise.} \end{cases} \quad (4)$$

Here, parameters a, b, $\tau_1$, and $\tau_2$ indicate maximum output, minimum output, and the first and second thresholds of the function, respectively. In practice, the a and b variables are set to "1" and "0", respectively. Therefore, the thresholds for the quantization level, $\gamma_1$ and $\gamma_2$, may be set equal to $\tau_1$ and $\tau_2$, respectively.

Sign changes are considered on both sides (406 and 408) of the block boundary as measures of the complexity of the blocks that are divided by the block boundary. In block 216 this gain is adjusted in accordance with the measured picture conditions. If μ is the average pixel intensity of a row or column of a sub-block containing an artifact at one of its ends, a single sign change is defined to be a pixel's intensity transitioning from being greater/lesser than μ to being lesser/greater than μ. The number of sign changes is the number of such pixels there are in row or column being considered.

The number of sign changes in a row or column of a sub-block, $N_{sign}$, is computed by counting the number of pixels whose sign differs from its neighbor. Formally this event depends on the mean value of a row or column, computed in Eq. (5).

$$\mu = \frac{\sum_{i=0}^{7} f(i)}{N(f)}, \quad (5)$$

clipping the pixel intensities after subtracting the local mean to create $f_s(i)$ from $f(\mu)$, $$f_s(i) = \begin{cases} 1, & \text{if } f(i) > \mu \text{ for } i = 0, \ldots, 7 \\ 0, & \text{otherwise} \end{cases} \quad (6)$$

and counting sign changes as the row or column is traversed from one end to the other as in Eq. (7)

$$N_{sign} = \sum_{i=0}^{6} |f_s(i) - f_s(i+1)|. \quad (7)$$

In Eq. (5), $N(\cdot)$ indicates the number of elements in $(\cdot)$. Then $\Delta$ is adjusted again by $$\Delta_s = \Delta_Q g_{sign}(N_{sign}).$$

This procedure reduces $\Delta_Q$ if the complexity of the corresponding block is high and filters the input block less.

Content activity is computed by analyzing the block contents along with the sign changes. The activity is computed by $$f_d(i) = |f(i) - f(i+1)|, \text{ for } i = 0, \ldots, 6 \quad (8)$$

$$f_A(i) = \begin{cases} 1, & \text{if } \eta_1 < f_d(i) < \eta_2 \text{ for } i = 0, \ldots, 6, \\ 0, & \text{otherwise} \end{cases}$$

and $$N_A = \sum_{i=0}^{6} f_A(i).$$

where $f_d(\cdot)$ is the absolute difference between adjacent pixels, and $\eta_1$ and $\eta_2$ are the upper and lower thresholds for this quantity.

This data causes a modification to $\Delta_S$ defined by $$\Delta_A = \Delta_s \cdot g_A(N_A). \quad (9)$$

The adjusted block difference $\Delta_A$ is used instead of the value $\Delta$ to control the filter gain in practice. Though not explicitly stated, any filter parameter may be made to vary with $\Delta$.

It is noted that the system may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

It should also be apparent to a skilled technologist that one or more elements of a device disclosed herein may be rearranged without affecting the operation of the device. Similarly, one or more elements of a device disclosed herein may be combined without affecting the operation of the device. Those of ordinary skill in the art would understand that information and signals may be represented using any of a variety of different technologies and techniques. Those of ordinary skill would further appreciate that the various illustrative logical blocks, modules, and algorithm blocks described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The blocks of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

In addition, the various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added without departing from the spirit or scope of the disclosed method and apparatus. The description of the system is intended to be illustrative, and not to limit the scope of the claims.

What is claimed is:

1. A method of reducing video artifacts due to compression noise, comprising:
    decoding data representing a compressed image of the video;
    locating block boundaries in the decoded image;
    estimating the strength of the artifacts, determined from data representing the decoded image, on the block boundaries;
    smoothing at least one section of the block boundaries having artifacts, wherein the amount of smoothing is based on the strength of the artifacts detected in the section, includes:
        smoothing performed based at least in part on a quantization level formed by combining a first value taken from data representing an encoded sub-block and a second value estimated based on a plurality of block edge statistics derived from data representing a decoded sub-block, the plurality of block edge statistics includes:
            calculating the plurality of block edge statistics, determined by the video intensities of the pixels of sub-block, which comprise a block edge metric, a block ratio metric, a block count metric and a block activity metric, forming a weight factor from values of the block edge statistics by mapping to an interval extending from zero to one using a weighting function specific to that metric, and forming a composite weight factor the indicative of the strength of the compression noise in the sub-block by multiplying the weight factors together, replacing at least one section of the block boundaries having artifacts with the smoothed version of the section; and wherein the weight factors are multiplied together to form a composite weight factor indicative of the strength of the compression noise in the sub-block.

2. The method of claim 1, additionally comprising individually averaging a sub-block weight factor over the image to form a global weight factor.

3. The method of claim 2, wherein the composite weight factor and the global weight factor are multiplied together so as to form a global compression strength.

4. The method of claim 3, wherein the sub-block is smoothed subsequent to the determination that the global compression strength is less than a variable found by mapping the quantization level to the interval [0,1] by use of a weighting function.

5. The method of claim 1, wherein a plurality of smoothing parameters are based on the magnitude of the discontinuity at the sub-block's boundary.

6. The method of claim 5, wherein the magnitude of the discontinuity is modified by one of the parameters that is indicative of the quantization level and one of the parameters that is associated with sign changes detected along a path of pixels that leads to the discontinuity, wherein the path is perpendicular to the boundary on which the artifact lies, and wherein the local mean has been subtracted from the intensity of each pixel in the path.

7. The method of claim 5, wherein one of the parameters that is indicative of the activity in the values of the intensity of the video in the path of pixels modifies the magnitude of the discontinuity.

8. The method for claim 1, wherein the compression noise is caused by using a block based compression algorithm.

9. A system for reducing video artifacts due to compression noise, comprising:
means for decoding data representing an encoded image of the video;
means for locating block boundaries in a decoded image;
means for estimating strength of artifacts, determined from data representing the decoded image, on the block boundaries; and
means for smoothing at least one section of the block boundaries having artifacts, wherein the amount of smoothing is based on the strength of the artifacts detected in the selection, includes:
smoothing performed based at least in part on a quantization level formed by combining a first value taken from data representing an encoded sub-block and a second value estimated based on a plurality of block edge statistics derived from data representing a decoded sub-block, the plurality of block edge statistics includes:
calculating the plurality of block edge statistics, determined by the video intensities of the pixels of sub-block, which comprise a block edge metric, a block ratio metric, a block count metric and a block activity metric,
forming a weight factor from values of the block edge statistics by mapping to an interval extending from zero to one using a weighting function specific to that metric, and
forming a composite weight factor the indicative of the strength of the compression noise in the sub-block by multiplying the weight factors together,
means for replacing at least one section of the block boundaries having artifacts with the smoothed version of the section; and
wherein the weight factors are multiplied together to form a composite weight factor indicative of the strength of the compression noise in the sub-block.

10. The system of claim 9, wherein the compression noise is caused by using a block based compression algorithm.

11. A system for reducing video artifacts due to compression noise, comprising:
a decoder configured to receive compressed video indicative of a plurality of encoded images;
an estimator configured to determine block boundaries in each decoded image and estimates the strength of artifacts, determined from data representing the decoded image, in the block boundaries; and
an image artifact filter configured to:
smooth at least one section of the block boundaries having artifacts, wherein the amount of smoothing is based on the strength of the artifacts detected in the section, includes:
the smoothing performed based at least in part on a quantization level formed by combining a first value taken from data representing an encoded sub-block and a second value estimated based on a plurality of block edge statistics derived from data representing a decoded sub-block, the plurality of block edge statistics includes:
calculating the plurality of block edge statistics, determined by the video intensities of the pixels of sub-block, which comprise a block edge metric, a block ratio metric, a block count metric and a block activity metric,
a weight factor from values of the block edge statistics mapped to an interval extending from zero to one using a weighting function specific to that metric, and
a composite weight factor indicative of the strength of the Compression noise in the sub-block from multiplying the weight factors together,
replace at least one section of the block boundaries having artifacts with the smoothed version of the section; and
wherein the weight factors are multiplied together to form a composite weight factor indicative of the strength of the compression noise in the sub-block.

* * * * *